US009787531B2

(12) United States Patent
Floyd, III et al.

(10) Patent No.: US 9,787,531 B2
(45) Date of Patent: Oct. 10, 2017

(54) AUTOMATIC NOTIFICATION OF ISOLATION

(71) Applicant: International Business Machines Corporation, Armonk, NY (US)

(72) Inventors: Robert K. Floyd, III, Richmond, VT (US); Baiju D. Mandalia, Boca Raton, FL (US); Robert P. Monaco, Croton, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 14/051,730

(22) Filed: Oct. 11, 2013

(65) Prior Publication Data

US 2015/0106490 A1 Apr. 16, 2015

(51) Int. Cl.
*H04L 12/24* (2006.01)
*H04L 12/26* (2006.01)
*G06F 11/07* (2006.01)

(52) U.S. Cl.
CPC ...... *H04L 41/0659* (2013.01); *H04L 41/0695* (2013.01); *G06F 11/0748* (2013.01);
(Continued)

(58) Field of Classification Search
CPC ............ H04L 41/0659; H04L 41/0695; H04L 43/0823; H04L 41/06; H04L 41/0681; H04L 41/0213; H04L 41/069; H04L 41/046; H04L 41/0654; H04L 45/28; G06F 11/0748; G06F 11/0784
(Continued)

(56) References Cited

U.S. PATENT DOCUMENTS

| 7,941,526 B1* | 5/2011 | Hope ............... H04L 41/069 709/224 |
| 2003/0105856 A1* | 6/2003 | Tse .................. H04L 41/06 709/224 |

(Continued)

FOREIGN PATENT DOCUMENTS

WO    WO 02084487    10/2002

OTHER PUBLICATIONS

Li et al., Automatic Fault Detection, Isolation, and Recovery in Transparent All-Optical Networks, Journal of Lightwave Technology, vol. 15, No. 10, Oct. 1997, pp. 1784-1793.

*Primary Examiner* — Backhean Tiv
*Assistant Examiner* — Clifton Houston
(74) *Attorney, Agent, or Firm* — Schmeiser, Olsen & Watts, LLP; Michael Petrocelli

(57) ABSTRACT

A method and associated systems of automatic notification of isolation of a first networked device. In response to detecting that it is not being properly managed by a network-management means, the first networked device creates a notification message that identifies the problem and requests proper network management. The device then transmits this message to any other device or networked node that it can communicate with, along with a request that recipients try to forward the message to the network-management means. If a device that receives the message is able to forward the message successfully, the network-management means takes appropriate steps to begin properly managing the first networked device.

8 Claims, 4 Drawing Sheets

(52) U.S. Cl.
CPC ......... *G06F 11/0784* (2013.01); *H04L 41/06* (2013.01); *H04L 41/0681* (2013.01)

(58) Field of Classification Search
USPC ................................................ 709/220–224
See application file for complete search history.

(56) References Cited

U.S. PATENT DOCUMENTS

| | | | | |
|---|---|---|---|---|
| 2004/0037279 | A1* | 2/2004 | Zelig | H04L 12/1836 370/390 |
| 2005/0071461 | A1* | 3/2005 | Mihm | G06F 11/0748 709/224 |
| 2005/0080843 | A1* | 4/2005 | Cabrera | H04L 69/329 709/200 |
| 2005/0091078 | A1* | 4/2005 | Hunt | H04L 41/042 380/282 |
| 2005/0102388 | A1* | 5/2005 | Tabbara | H04L 69/329 709/223 |
| 2007/0283192 | A1 | 12/2007 | Shevchenko | |
| 2008/0133978 | A1 | 6/2008 | Angamuthu et al. | |
| 2009/0161530 | A1 | 6/2009 | Yang et al. | |
| 2009/0248895 | A1* | 10/2009 | Archer | H04L 12/413 709/241 |
| 2011/0075662 | A1 | 3/2011 | Rathunde et al. | |
| 2011/0286462 | A1* | 11/2011 | Kompella | H04L 45/18 370/395.53 |
| 2012/0124167 | A1* | 5/2012 | Schlansker | H04L 45/48 709/217 |
| 2012/0254415 | A1* | 10/2012 | Ochi | H04L 41/0213 709/224 |
| 2013/0013806 | A1* | 1/2013 | Woo | H04W 72/005 709/238 |
| 2014/0269704 | A1* | 9/2014 | Alexander | H04W 4/06 370/390 |

\* cited by examiner

AUTOMATIC NOTIFICATION OF ISOLATION

TECHNICAL FIELD

The invention pertains to enabling a networked device to notify a network-management means that the networked device is not being properly managed.

BACKGROUND

When setting up a new network, adding a device or node to an existing network, or reconfiguring an existing network, it is possible that a networked device or a node of the network may not be assigned to a network-management means associated with the network. This may happen, for example, if an error is made when configuring a router, gateway, firewall, or other infrastructure component, or if an error is made in configuring the network-management means. In such a case, the network-management means may be unable to identify or correct the problem because the network-management means may not be aware of the existence of the networked device or node.

BRIEF SUMMARY

A first embodiment of the present invention provides a method for automatic notification of isolation of a first networked device, the method comprising:

the first networked device determining that the first networked device is not being properly managed by a network-management means;

the first networked device, in further response to the determining, assembling an automatic notification of isolation, wherein the automatic notification of isolation comprises an identification of the first networked device, an indication that the first networked device is not being properly managed by the network-management means, and a request to notify the network-management means that the first networked device is not being properly managed by the network-management means;

the first networked device, in further response to the determining, communicating the automatic notification of isolation to an adjacent networked device.

A second embodiment of the present invention provides a computer program product, comprising a computer-readable hardware storage device having a computer-readable program code stored therein, said program code configured to be executed by a processor of a computer system to implement a method for automatic notification of isolation of a first networked device, the method comprising:

the first networked device determining that the first networked device is not being properly managed by a network-management means;

the first networked device, in further response to the determining, assembling an automatic notification of isolation, wherein the automatic notification of isolation comprises an identification of the first networked device, an indication that the first networked device is not being properly managed by the network-management means, and a request to notify the network-management means that the first networked device is not being properly managed by the network-management means;

the first networked device, in further response to the determining, communicating the automatic notification of isolation to an adjacent networked device.

A third embodiment of the present invention provides a computer system comprising a processor, a memory coupled to said processor, and a computer-readable hardware storage device coupled to said processor, said storage device containing program code configured to be run by said processor via the memory to implement a method for automatic notification of isolation of a first networked device, the method comprising:

the first networked device determining that the first networked device is not being properly managed by a network-management means;

the first networked device, in further response to the determining, assembling an automatic notification of isolation, wherein the automatic notification of isolation comprises an identification of the first networked device, an indication that the first networked device is not being properly managed by the network-management means, and a request to notify the network-management means that the first networked device is not being properly managed by the network-management means;

the first networked device, in further response to the determining, communicating the automatic notification of isolation to an adjacent networked device.

DETAILED DESCRIPTION

Embodiments of the present invention comprise a method, computer system, program product, or service for automatically notifying a network-management means, system administrator, or other responsible entity that a networked device is not being actively managed, cannot properly convey its status to a network-management console, or is otherwise fully or partially isolated from a network-management means. In this document, "proper" management refers generally to management that conforms to a goal of those who design, manage, or maintain the network.

The present invention enables an unmanaged or improperly managed networked device to identify a network-management platform or other means by automatically alerting nearby devices of the fact the networked device is unmanaged or improperly managed. Rather than merely determining that a port, interface, or other component of a known, managed device is not working correctly, the present invention allows an unmanaged networked device, which might otherwise be invisible to a network-management means, to indirectly identify itself to the network-management means The present invention may perform this task by enabling an isolated, unmanaged, or improperly managed device to enlist adjacent networked devices as proxies that attempt to identify and notify a proper network-management means that the device is isolated, unmanaged, or improperly managed. Here, the isolated, unmanaged, or improperly managed device itself automatically initiates corrective action, rather than waiting passively for action to be taken by a network-management means to which the device may be invisible. Furthermore, embodiments of the present invention allow the isolated, unmanaged, or improperly managed device to take proactive action while the device is functioning normally, rather than waiting until the device requires immediate attention due to a malfunction or other problem.

Embodiments of the present invention are thus not intended to merely help a third-party entity monitor, detect, or correct a network-management error related to an other networked device. The present invention instead allows an isolated networked device to itself detect that it is not being properly managed and to respond to this detection by automatically identifying and enlisting the aid of other networked devices that, acting as proxies for the isolated device, forward a notification of the error to a network-management means.

Figure 1:
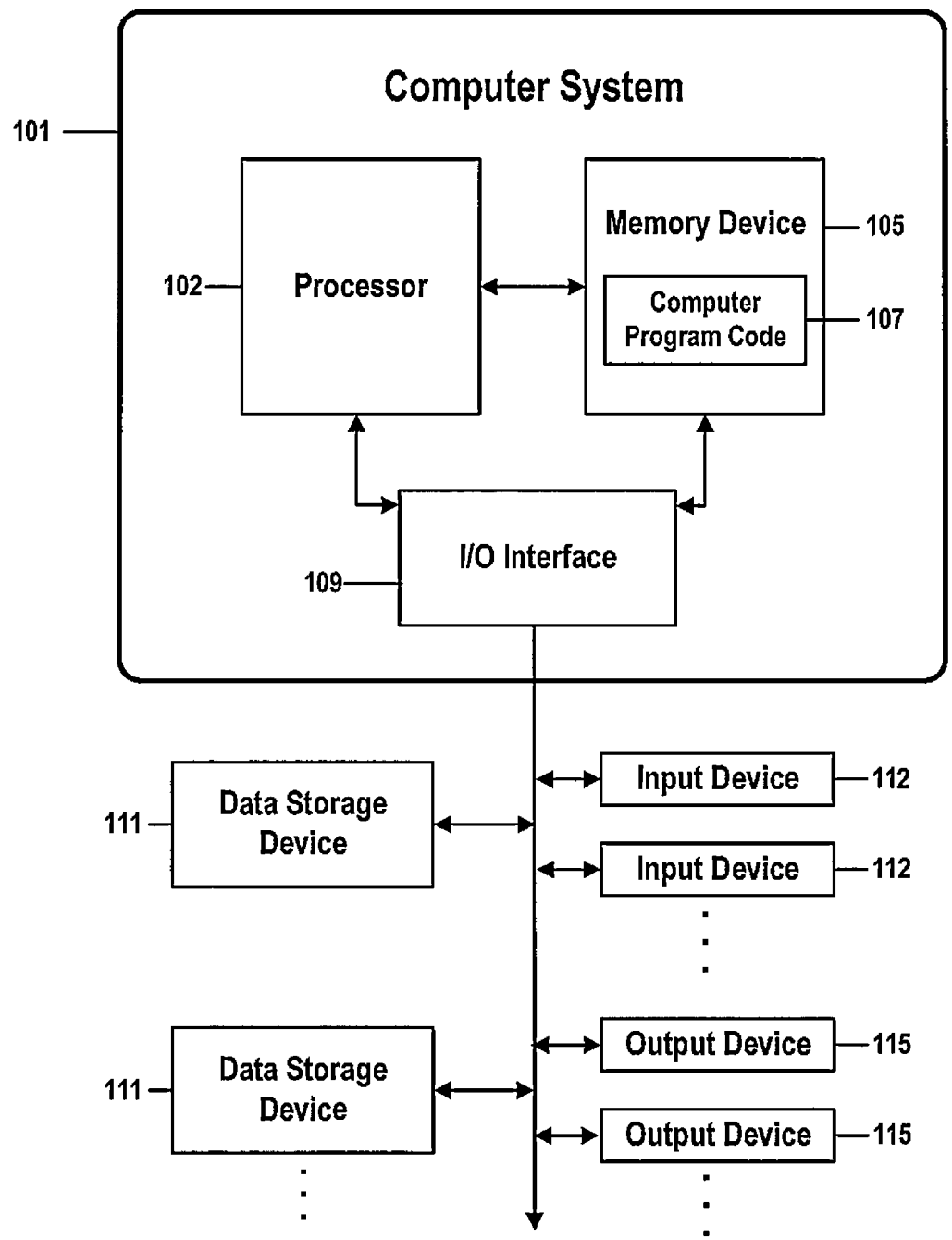
FIG. 1 shows the structure of a computer system and computer program code that may be used to implement a method of automatic notification of isolation in accordance with embodiments of the present invention.

FIG. 1 shows the structure of a computer system and computer program code that may be used to implement a method of automatic notification of isolation in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method of automatic notification of isolation in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method of automatic notification of isolation.

Any of the components of the present invention could be created, integrated, hosted, maintained, deployed, managed, serviced, supported, etc. by a service provider who offers to facilitate a method of automatic notification of isolation. Thus the present invention discloses a process for deploying or integrating computing infrastructure, comprising integrating computer-readable code into the computer system 101, wherein the code in combination with the computer system 101 is capable of performing a method of automatic notification of isolation.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for generating a service-catalog entry from discovered attributes of provisioned virtual machines may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for generating a service-catalog entry from discovered attributes of provisioned virtual machines is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

In some embodiments, a method of the present invention may be performed by a networked device or an other node of a network, such as a server, a virtual machine, a network interface, or an intelligent peripheral device, wherein the networked device or other node of a network comprises a combination of items identified in FIG. 1, including computer system 101, processor 102, memory device 105, computer program code 107, interface 109, one or more data storage devices 111, one or more input devices 112, or one or more output devices 115. In one example, networked device might comprise a computer workstation running a software agent that together perform a method of the present invention. In another example, a network-attached printer might comprise a combination of that performs a method of the present invention. In yet another embodiment, a computerized device may be connected to a network through an interface card, wherein the interface card comprises software, firmware, or hardware that performs a method of the present invention.

In some embodiments, a method of the present invention may be performed by a combination of items identified in FIG. 1, wherein the combination is directly or indirectly attached to, or otherwise directly or indirectly interfaces with, a networked device or an other node of a network.

The functionality of the present invention may be divided among multiple independent or related actors. The method of the present invention may, for example, be implemented through cooperative actions of software agents distributed throughout a combination of network-attached workstations, infrastructure components like routers and switches, and network-interface cards. Many other configurations are possible.

Figure 2:
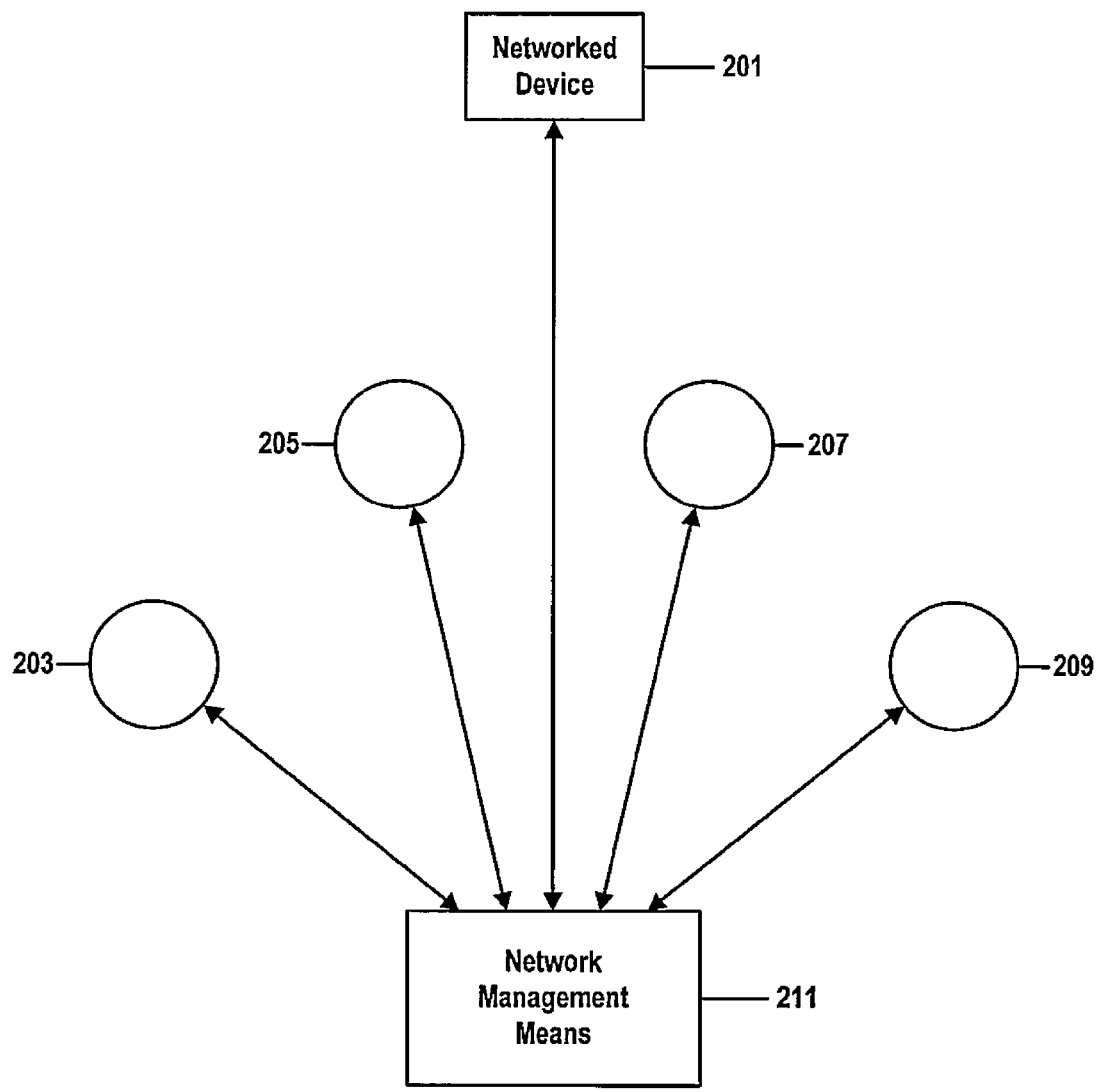
FIG. 2 illustrates a topology of a network in which a networked device 201 is communicating normally with a network-management means 211.

FIG. 2 illustrates a topology of a network in which a networked device 201 is communicating normally with a network-management means 211. FIG. 2 comprises items 201-211.

Item 201 is a networked device that is physically connected to a network as a node of the network. The networked device 201 may comprise any hardware, software, or virtual device that may be connected to the network via a physical, wireless, virtual, or other type of connection. Such devices may comprise, but are not limited to, combinations of a server, workstation, or other computer, a mobile device, a virtual machine, a port, an interface, a router, gateway, or switch, a printer or other computer peripheral device, a modem rack, a firewall, or an other type of network-attached software, physical or virtual hardware entity.

Embodiments of the present invention described in this document comprise implementations wherein the network is the Internet, an intranet, an extranet, or an other network based on the TCP/IP protocol stack or on the Open Systems Interconnection (OSI) protocol stack (which conforms to International Standards Organization's standard ISO/IEC 7498-1).

Other embodiments of the present invention may, however, be implemented on any type of physical, virtual, or other communications network or other infrastructure that is managed by a network-management entity and in which nodes of the network may communicate with each other.

Items 203, 205, 207, and 209 identify other networked devices connected to nodes on the network. Each of these nodes may comprise, but are not limited to, combinations of the types of entities that may be comprised by networked node 201.

Item 211 is a network-management means, which may comprise a combination of hardware devices, software programs, communications protocols, communications interfaces, procedures, standards, human operators, reporting mechanisms, data repositories, or other entities that may be used to identify, manage, or manipulate a characteristic of a network node or of an entity connected to the network through a node.

In FIG. 2, the network-management means 211 is able to communicate bidirectionally with all of networked devices 201-209. These bidirectional communications allow the network-management means 211 to perform normal or proper network-management functions, such as periodically polling a networked device by communicating to the device a request for an acknowledgement of the request or an identification of a characteristic of the device, and then receiving the requested acknowledgement or identification in response to the request.

In some embodiments, a network-management means 211 may comply with the SNMP (Simple Network Management Protocol) network-management standard, which may be used to manage networked devices on the Internet or on other networks based on the TCP/IP protocol stack. SNMP is a component of the Internet Protocol Suite defined by the Internet Engineering Task Force (IETF). In normal operation, an SNMP-compliant network-management means 211 may detect a condition of a networked device 201 that warrants administrative attention, and may perform many other network-management functions, such as configuring or allocating a network resource, assigning a priority to a stream of network traffic, adding or deleting network nodes or networked devices, and load-balancing concurrent demands on network resources.

In other embodiments, network-management means 211 may comprise other types of network-management mechanisms and functions and may conform to protocols in addition to, or instead of, SNMP. Furthermore, other embodiments may comprise other combinations of and types of networked devices, networks, communications protocols, and network topologies.

In some embodiments, the network may comprise a combination of other communications or network-management protocols, known now or in the future to those skilled in the art, such as Transmission Control Protocol (TCP), Internet Protocol (IP), frame relay, Ethernet, Subnetwork Access Protocol (SNAP), SNMP, and other communications and management protocols related to wide-area, local-area, cellular, or other types of networks and communications infrastructures.

Figure 3:
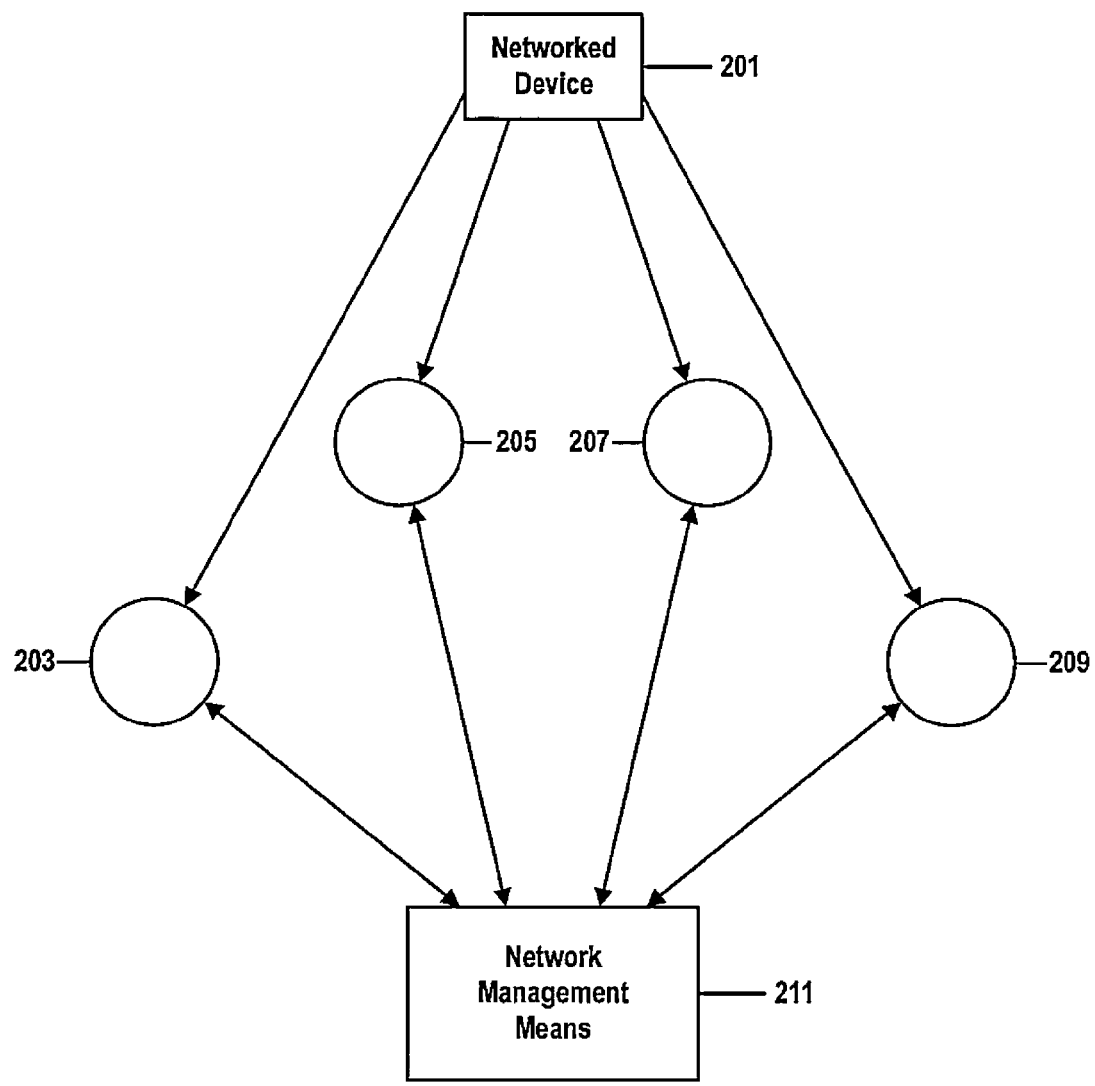
FIG. 3 illustrates the network topology of FIG. 2, wherein the networked device 201, in response to finding itself unable to communicate normally with the network-management means 211, employs a method of the present invention to automatically notify the network-management means of the device 201's isolation.

FIG. 3 illustrates the network and networked devices of FIG. 2, wherein the networked device 201, in response to finding itself unable to communicate normally with the network-management means 211, employs a method of the present invention to automatically notify the network-management means of the device 201's isolation. FIG. 3 comprises items 201-211.

As in FIG. 2, items 203-209 of FIG. 3 each identify a networked device attached to the network-management means 211. But here, unlike in FIG. 2, networked device 201 is isolated from the network-management means 211.

Despite this isolation, embodiments of the present invention allow networked device 201 to attempt to indirectly notify network-management means 211 of the existence of device 201 by requesting devices 203-209 to notify network-management means 211 on behalf of isolated device 201.

As shown in FIG. 3, networked device 201 has responded to a detection of device 201's isolation from network-management means 211, by initiating communications with adjacent devices 203-209, wherein an adjacent device is one with which networked device 201 may communicate via the network or via an other communications means. In FIG. 3, networked devices 203-209 are adjacent to networked device 201, but in other embodiments, many other networked devices may be similarly adjacent.

An adjacent device may or may not be able to communicate directly or indirectly with network-management means 211 and, even if it can, networked device 201 may not know this fact for certain. Networked device 201 may not even know the identity of the network-management means 211 or may not know if such a network-management means exists or is operational.

Nonetheless, the networked device 211, in conformance with embodiments of the present invention, upon determining that it is isolated from network-management means 211, creates and communicates an automatic notification of isolation to some or all adjacent devices in hope that at least one of those adjacent devices will be able to act as a proxy for the networked device 201 and forward the automatic notification of isolation to the network-management means 211.

Some embodiments of the present invention may enable a group of devices to act as proxies for each other. In such a case, each isolated device of the group of isolated devices may flood the network with automatic notifications of isolation sent from any of its interfaces or ports to an other device of the multiple isolated devices that has not sent its own notification of isolation. Other devices of the designated group of devices may then act as proxies for the isolated device. If a plurality of devices of the group are isolated, an other devices of the group may each act as a proxy for more than one device.

Figure 4:
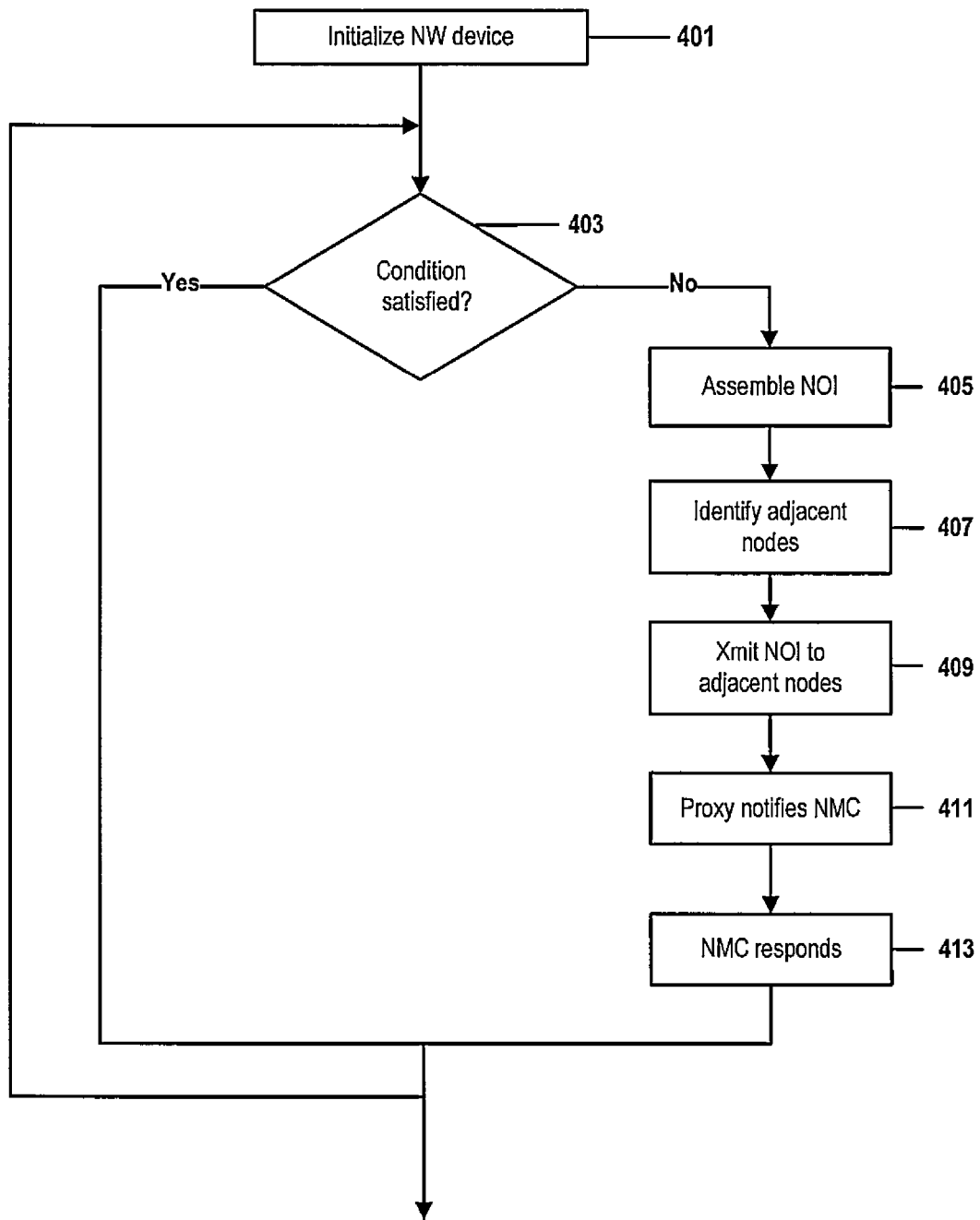
FIG. 4 is a flow chart that illustrates an embodiment of the present invention that comprises the networked devices, network-management means, and network topology of FIG. 2 and FIG. 3.

Examples of the mechanism by which embodiments of the present invention perform these tasks are described in greater detail in FIG. 4.

FIG. 4 is a flow chart that illustrates an embodiment of the present invention that comprises the networked devices, network-management means, and network of FIG. 2 and FIG. 3. FIG. 4 comprises steps 401-413.

In step 401, networked device 201 is attached to the network and initialized. Initialization may comprise a combination of implementation-dependent steps related to configuring and attaching the networked device 201 to the network, wherein some or all of the implementation-dependent steps may be known skilled in the relevant arts.

Initialization may further comprise installing or configuring software related to an embodiment of the present invention on the networked device 201, on other networked devices 203, 205, 207, or 209, or on the network-management means 211. This software may comprise all or part of computer program code 107, as shown in FIG. 1.

In some embodiments, initialization may comprise setting a minimum polling frequency that helps determine, all or in part, whether the networked device 201 is being properly managed by the network-management means 211.

In some embodiments, the method of the present invention may be implemented as a software program or "agent" that runs on the networked device 201 and that may be installed on the networked device 201 during, before, or after the initialization of step 401. In other embodiments, the method may be implemented as a component of a network-management client installed on the networked device during, before, or after the initialization. Some embodiments may further require an identical, similar, or related agent, network-management component, other software entity to be installed or running on one or more of adjacent networked devices 203, 205, 207, and 209.

In yet other embodiments, the method of the present invention may be implemented through an action of one or more hardware or software components of the network itself, of a network operating system, or of a network-management means associated with the network, where such a component or means comprises a network-analyzing software entity known to those skilled in the art of computer networking, such as a "bot," "spider," or "webcrawling" entity.

In step 403, the method of the present invention determines whether one or more conditions are satisfied, wherein satisfaction of the one or more conditions indicates that the networked device 201 is not isolated from the network-management means 211.

One or more of the one or more conditions may be implementation-dependent or may be a function of a characteristic of the network, of a node of the network, of a network-attached hardware, software, or virtual device, of a business goal, of a technical goal of a network designer, administrator, or manager, or of an other implementation-specific factor.

The one or more conditions may comprise, but are not limited to: receipt of a polling signal, acknowledgement request, or other communication from the network-management means 211; receipt of a polling signal, acknowledgement request, or other communication from network-management means 211 within a certain duration of time; an indication that network-management means 211 is operating normally or that an interface or other component of network-management means 211 is operating normally; an other indication that a valid route exists through the network or through an other communications infrastructure to the network-management means 211; or an other indication that the networked device 201 is not isolated, all or in part, from the network-management means 211.

In one set of embodiments, step 403 may comprise considering one or more conditions that comprise whether the networked device 201 is in general able to confirm that the network-management means 211 has received updated management information or a request for a communication from the networked device 201; is in general able to receive a request for updated management information or a request for an other communication from the network-management means 211; or is in general able to confirm that the network-management means 211 has received requested management information sent by the networked device 201, wherein the requested management information was requested by the network-management means 211.

In some embodiments, a condition of step 403 may comprise determining whether a frequency at which the networked device 201 is receiving polling communications or other communications from the network-management means 211 is greater than or equal to the minimum polling frequency identified during the initialization procedure of step 401.

If the embodiment of FIG. 4 determines in step 403 that the one or more conditions are satisfied, then the embodiment of FIG. 4 returns to step 403 to again test the same one or more conditions. In some embodiments, the method may pause before returning to step 403. This pause may be a function of implementation-specific parameters, such as a mean-time-between-failure projection or a proper SNMP-compliant polling frequency of the network-management means 211.

If the embodiment of FIG. 4 determines in step 403 that the one or more conditions are not satisfied, then the embodiment of FIG. 4 continues with steps 405-413.

Step 405 comprises, in response to the determining that the one or more conditions of step 403 are not satisfied, assembling an automatic notification of isolation intended to inform the network-management means 211 that the networked device 201 is isolated or otherwise not properly managed by the network-management means 211.

This automatic notification of isolation may be any type of message that may be sent over the network and may be implementation-dependent. In a TCP/IP network that comprises an Ethernet protocol, for example, the notification may comprise one or more standard Ethernet frames that conform to standards known to those of ordinary skill in the art of data communications. In networks that comprise the SNMP network-management protocol, the notification may comprise information meaningful to an SNMP-compliant network-management means.

In other embodiments, including embodiments that comprise a network other than a TCP/IP-compliant network, or that comprise an alternate communications protocol instead of the Ethernet protocol, the automatic notification of isolation may conform to a different format, standard, convention, or specification that may be known now or in the future to those skilled in the art. The method and some embodiments of the present invention do not depend upon the exact format, standard, or specification to which the notification message conforms.

Nonetheless, the content of the notification may be at least in part implementation-dependent, and may comprise a combination of:
an identifier of the isolated networked device 201;
an identifier of the network-management means 211, if known;
an identification of a time elapsed since a last contact with the network-management means 211;
a reason for communicating the notification, wherein the reason may comprise, but is not limited to: to report the networked device 201's apparent lack of network-management; to report a disconnected port; to report an improperly functioning interface; or to report an inability of the networked device 201 to reach a gateway, router, or switch; and
other information associated with notification of a failure of a network-management mechanism.

In embodiments wherein the automatic notification of isolation comprises one or more Ethernet frames, the content of the notification may be stored as one or more payloads of the one or more frames, in compliance with data-communications procedures known to those skilled in the art. In such embodiments, the one or more Ethernet frames may be formatted as broadcast messages, which specify a special broadcast destination address that directs the network to forward the broadcast messages to any entity capable of receiving an Ethernet frame. In some embodiments, this broadcast destination address may comprise a special sequence of hexadecimal digits. In some embodiments, this special sequence, which specifies a general destination of a broadcast message may comprise the sequence FF:FF:FF:FF:FF:FF.

In step 407 the isolated device 201 may attempt to identify adjacent nodes 203-209, wherein an adjacent node of the identified adjacent nodes is capable of receiving communications from the networked device 201 through the network or through other means, and wherein the adjacent node may be capable of communicating to the network-management means 211 in order to act as a proxy for the networked device 201. Here, a proxy is a device that forwards the automatic notification of isolation created in step 405 to the network-management means 211 on behalf of the isolated device 201.

The identifying of adjacent nodes may be performed through any combination of means known now or in the future to those skilled in the art of data communications or of other relevant arts. The identifying may, for example, be performed by means that comprise, but are not limited to: broadcasting a request that an adjacent device identify itself to the networked device 201; referring to stored network-configuration information; or requesting network-configuration information from an other entity.

In some embodiments, the first networked device may be unable to identify specific adjacent devices, or may be unable to determine whether any adjacent devices even exist. In such cases, the first networked device may, as described below, broadcast the automatic notification of isolation by sending the notification to all available ports and interfaces known by the first networked device to be connected to the first network device. This sending may be performed once, a specified number of times, or repeatedly until a condition or a set of conditions is satisfied. Here, the first networked device attempts to circumvent its inability to identify components of its network environment by flooding all known possible communications paths with a broadcast notification sent to any entity, known or unknown, that might possibly be able to receive the notification.

Step 409 comprises the networked device 201 communicating the automatic notification of isolation assembled in step 405 to one or more of the adjacent networked devices 203-209 identified in step 407. This communicating may be performed by any means known to those skilled in the relevant arts and may occur over the network, over an other related or unrelated tethered or wireless network, or by other means of communication. In all cases, the isolated networked device 201 must be able to directly or indirectly communicate with the identified adjacent networked devices 203-209, and the identified adjacent networked devices 203-209 must be at least potentially able to act as proxies for isolated networked device 201. In some embodiments, this potential ability to act as a proxy may be indicated by a characteristic as as simple as a device's mere attachment to the network.

In some embodiments, the communicating of step 409 may be performed by the networked device 201 transmitting the automatic notification of isolation as a broadcast message through all available ports and network interfaces comprised by or accessible to the networked device 201.

In a TCP/IP network that comprises the Ethernet protocol, this communicating may comprise broadcasting the automatic notification of isolation as one or more Level 2 (Media Access Control) Ethernet frames. In some embodiments, the communicating may be performed in compliance with the IEEE 802-related Subnetwork Access Protocol (SNAP), which allows the communicating to traverse networks that conform to multiple SNAP-compliant protocols, including Ethernet and Frame Relay. In other embodiments, the automatic notification of isolation may be broadcast by one or more other means, at other levels of a network protocol stack, or in conformance with other standards, conventions, or protocols.

In step 411, one or more of the adjacent networked devices 203-209, having received the automatic notification of isolation communicated in step 409, determines that it is capable of becoming a proxy for the isolated networked device 201. Here, being capable of becoming a proxy may comprise being able to identify or to communicate with the network-management means 211, wherein the network-management means 211 is capable of or should be capable of managing the isolated networked device 201. In some cases, being capable of becoming a proxy may comprise merely recognizing an ability to attempt such an identification or communication.

After determining that it is capable of becoming a proxy, the proxy adjacent device responds to the receipt of the automatic notification of isolation in step 409 by forwarding the received notification to the network-management means 211, wherein the forwarding is intended to notify the network-management means 211 of the existence of the isolated networked device 201, to identify the isolated networked device 201, to identify a route through the network to the isolated networked device 201, or to identify a problem related to the failure of the network-management means 211 to properly manage the isolated networked device 201. This intending may be a function of the content of the automatic notification of isolation.

In some embodiments, the forwarding may be accomplished by means of procedures and techniques known to those skilled in the art and that comply with a standard or convention that may comprise, but is not limited to, a SNAP-compliant communication, a syslog computer-logging message, or an SNMP agent-to-manager trap notification.

In some embodiments, the proxy may modify the automatic notification of isolation before forwarding it. Such modifications may comprise, but are not limited to, converting the notification from a broadcast message to a unicast or multicast message; replacing the original destination address of the notification with one or more addresses of one or more specific network-management means known to the proxy, or with one or more addresses of a router, switch, firewall, gateway, or other networked device; or adding an identifier to the notification that identifies a port or interface from which the notification was received by the proxy or was sent by the isolated networked device 201.

In some embodiments, if the proxy device successfully identifies or communicates with the network-management means 211, the proxy device will then notify the isolated networked device 201 of the successful identification of or communication.

In step 413, the network-management means 211 may respond to a successful receipt of the forwarded automatic notification of isolation by taking a responsive measure. The responsive measure may be implementation-dependent and may be a function of a characteristic of the network, of a characteristic of a protocol comprised by the network, of a characteristic of the notification, of a characteristic of the isolated networked device 201, of a technological constraint, of a business goal, or of a design goal.

The responsive measure may, for example, comprise automatically adding the isolated network device 201 to the network-management means 211's network-management responsibilities. In other cases, the response may comprise notifying a system administrator or network manager of an issue related to the isolation of the networked device 201, in order for the administrator or manager to analyze the problem and take further action. Many other types of responsive measures are possible, based on procedures and techniques known to those skilled in the art, and may not be novel components of the present invention.

Methods in conformance with embodiments of the present invention may comprise other variations of the method of FIG. 4. Examples cited in this document are for illustrative purposes only and are not meant to limit embodiments of the present invention to characteristics specific to those examples.

Similarly, many other possible combinations of physical hosts or servers, virtual machines, operating systems, middleware, applications, hardware components, communications devices, and other physical or virtual resources may be discovered and used by embodiments of the present invention to perform a method of automatic notification of isolation in conformance with embodiments of the present invention described in FIGS. 1-4.

Common to all these embodiments, however, is the concept of enabling a networked device that is isolated from a network-management means or that is otherwise not properly managed, to respond to a detection of this isolation or improper management by automatically identifying and enlisting the aid of other networked devices that, acting as proxies for the isolated device, attempt to forward a notification of the isolation or improper management from the isolated device to the network-management means.

What is claimed is:

1. A method for automatic notification of isolation of a first networked device attached to a network, the method comprising:

the first networked device attempting to identify whether the first networked device has received a polling signal from a network-management means within a predetermined duration of time and whether the network-management means has received requested management information from the first networked device;

the first networked device determining that the first networked device is not being properly managed by a network-management means, where the determining consists of the first networked device identifying that the first networked device has not received a polling signal from the network-management means within the predetermined duration of time and where the determining does not comprise identifying that the network-management means has received the requested management information from the first networked device;

wherein the determining further comprises: determining that a network-management client software component is not running on the first networked device, wherein the network-management client software component is necessary for the first networked device to be properly managed by the network-management means;

the first networked device, in response to the determining, assembling an automatic notification of isolation, wherein the automatic notification of isolation comprises an identification of the first networked device, an indication that the first networked device is not being properly managed by the network-management means, and a request to notify the network-management means that the first networked device is not being properly managed by the network-management means; and the first networked device, in further response to the determining, communicating the automatic notification of isolation to an adjacent networked device, wherein the adjacent networked device is a hardware, software, or virtual entity that is able to receive communications from the first networked device through the network,
wherein the communicating comprises requesting the adjacent networked device to act as a proxy for the first networked device,
wherein the acting as a proxy comprises: notifying the network-management means that the first networked device is not being properly managed by the network-management means, receiving the automatic notification of isolation from the first networked device, modifying the content of the automatic notification of isolation, and transmitting the modified automatic notification of isolation to the network-management means,
wherein the modifying comprises adding to the received automatic notification of isolation an identification of the network path through which the automatic notification of isolation was received by the adjacent device,
wherein the communicating further comprises repeatedly broadcasting the automatic notification of isolation via all accessible communications means that are known to the first networked device to be capable of communicating with the adjacent networked device, and
wherein the first networked device does not know an Ethernet address of the adjacent networked device.

2. The method of claim 1, wherein the automatic notification of isolation comprises: an identifier of the first networked device; an identifier of any known network-management means; an identification of a time elapsed since a last contact with any network-management means; and a description of a condition that indicates a failure of a network-management function.

3. The method of claim 1, wherein the assembling further comprises formatting the automatic notification of isolation as one or more Ethernet frames, and wherein a destination address of every frame of the one or more Ethernet frames comprises a hexadecimal code FF:FF:FF:FF:FF:FF.

4. The method of claim 1, further comprising providing at least one support service for at least one of creating, integrating, hosting, maintaining, and deploying computer-readable program code in the computer system, wherein the computer-readable program code in combination with the computer system is configured to implement the determining, assembling, and communicating.

5. A computer program product, comprising a computer-readable hardware storage device having a computer-readable program code stored therein, said program code configured to be executed by a processor of a computer system to implement a method for automatic notification of isolation of a first networked device attached to a network, the method comprising:

the first networked device attempting to identify whether the first networked device has received a polling signal from a network-management means within a predetermined duration of time and whether the network-management means has received requested management information from the first networked device;

the first networked device determining that the first networked device is not being properly managed by a network-management means, where the determining consists of the first networked device identifying that the first networked device has not received a polling signal from the network-management means within the predetermined duration of time and where the determining does not comprise identifying that the network-management means has received the requested management information from the first networked-device;
wherein the determining further comprises: determining that a network-management client software component is not running on the first networked device, wherein the network-management client software component is necessary for the first networked device to be properly managed by the network-management means;

the first networked device, in response to the determining, assembling an automatic notification of isolation, wherein the automatic notification of isolation comprises an identification of the first networked device, an indication that the first networked device is not being properly managed by the network-management means, and a request to notify the network-management means that the first networked device is not being properly managed by the network-management means; and the first networked device, in further response to the determining, communicating the automatic notification of isolation to an adjacent networked device, wherein the adjacent networked device is a hardware, software, or virtual entity that is able to receive communications from the first networked device through the network,
wherein the communicating comprises requesting the adjacent networked device to act as a proxy for the first networked device,
wherein the acting as a proxy comprises: notifying the network-management means that the first networked device is not being properly managed by the network-management means, receiving the automatic notification of isolation from the first networked device, modifying the content of the automatic notification of isolation, and transmitting the modified automatic notification of isolation to the network-management means,
wherein the modifying comprises adding to the received automatic notification of isolation an identification of the network path through which the automatic notification of isolation was received by the adjacent device,
wherein the communicating further comprises repeatedly broadcasting the automatic notification of isolation via all accessible communications means that are known to the first networked device to be capable of communicating with the adjacent networked device, and
wherein the first networked device does not know an Ethernet address of the adjacent networked device.

6. The computer program product of claim 5, wherein the automatic notification of isolation comprises: an identifier of the first networked device; an identifier of any known network-management means; an identification of a time elapsed since a last contact with any network-management means; and a description of a condition that indicates a failure of a network-management function.

7. The computer program product of claim 5, wherein the assembling further comprises formatting the automatic notification of isolation as one or more Ethernet frames, and wherein a destination address of every frame of the one or more Ethernet frames comprises a hexadecimal code FF:FF:FF:FF:FF:FF.

8. A computer system comprising a processor, a memory coupled to said processor, and a computer-readable hardware storage device coupled to said processor, said storage device containing program code configured to be run by said processor via the memory to implement a method for automatic notification of isolation of a first networked device attached to a network, the method comprising:

the first networked device attempting to identify whether the first networked device has received a polling signal from a network-management means within a predetermined duration of time and whether the network-management means has received requested management information from the first networked device;

the first networked device determining that the first networked device is not being properly managed by a network-management means, where the determining consists of the first networked device identifying that the first networked device has not received a polling signal from the network-management means within the predetermined duration of time and where the determining does not comprise identifying that the network-management means has received the requested management information from the first networked-device;

wherein the determining further comprises: determining that a network-management client software component is not running on the first networked device, wherein the network-management client software component is necessary for the first networked device to be properly managed by the network-management means;

the first networked device, in response to the determining, assembling an automatic notification of isolation, wherein the automatic notification of isolation comprises an identification of the first networked device, an indication that the first networked device is not being properly managed by the network-management means, and a request to notify the network-management means that the first networked device is not being properly managed by the network-management means; and the first networked device, in further response to the determining, communicating the automatic notification of isolation to an adjacent networked device wherein the adjacent networked device is a hardware, software, or virtual entity that is able to receive communications from the first networked device through the network, wherein the communicating comprises requesting the adjacent networked device to act as a proxy for the first networked device, wherein the acting as a proxy comprises: notifying the network-management means that the first networked device is not being properly managed by the network-management means, receiving the automatic notification of isolation from the first networked device, modifying the content of the automatic notification of isolation, and transmitting the modified automatic notification of isolation to the network-management means, wherein the modifying comprises adding to the received automatic notification of isolation an identification of the network path through which the automatic notification of isolation was received by the adjacent device, wherein the communicating further comprises repeatedly broadcasting the automatic notification of isolation via all accessible communications means that are known to the first networked device to be capable of communicating with the adjacent networked device, and wherein the first networked device does not know an Ethernet address of the adjacent networked device.

* * * * *